United States Patent [19]
Stone

[11] Patent Number: 5,904,844
[45] Date of Patent: *May 18, 1999

[54] FUEL FILTER ELEMENT

[75] Inventor: Walter H. Stone, Modesto, Calif.

[73] Assignee: Parker Intangibles Inc., Wilmington, Del.

[*] Notice: This patent is subject to a terminal disclaimer.

[21] Appl. No.: 08/818,616

[22] Filed: Mar. 14, 1997

Related U.S. Application Data

[63] Continuation of application No. 08/441,583, May 15, 1995, Pat. No. 5,622,623, which is a continuation of application No. 08/131,824, Oct. 5, 1993, abandoned, which is a division of application No. 08/097,787, Jul. 27, 1993, abandoned, which is a division of application No. 07/683,096, Apr. 10, 1991, Pat. No. 5,244,571, which is a continuation of application No. 07/586,827, Sep. 24, 1990, abandoned, which is a division of application No. 07/370,097, Jun. 20, 1989, Pat. No. 4,997,555, which is a continuation of application No. 07/242,791, Sep. 8, 1988, abandoned, which is a continuation of application No. 07/032,834, Mar. 30, 1987, abandoned, which is a continuation-in-part of application No. 06/784,292, Oct. 7, 1985, Pat. No. 4,692,245, which is a continuation-in-part of application No. 06/733,808, May 14, 1985, Pat. No. 4,668,393.

[51] Int. Cl.⁶ .................................................. B01D 27/08
[52] U.S. Cl. ............................................ 210/232; 210/444
[58] Field of Search ..................................... 210/232, 248, 210/416.4, 444

[56] References Cited

U.S. PATENT DOCUMENTS

| 1,002,792 | 9/1911 | Weitzenhoffer . | |
|---|---|---|---|
| 1,616,577 | 2/1927 | Janette . | |
| 1,742,743 | 1/1930 | Worbois . | |
| 1,746,336 | 2/1930 | Breer . | |
| 1,805,903 | 5/1931 | Bull . | |
| 1,861,576 | 6/1932 | Liddell . | |
| 1,951,484 | 3/1934 | Lawes | 210/164 |
| 2,326,691 | 8/1943 | Sohum | 210/103 |
| 2,418,777 | 4/1947 | LeClair | 210/166 |
| 2,478,109 | 8/1949 | Kamrath | 210/165 |
| 2,494,884 | 1/1950 | Lassman et al. | 103/2 |
| 2,507,818 | 5/1950 | Sager | 210/183 |
| 2,524,336 | 10/1950 | Vokes | 210/187 |
| 2,651,414 | 9/1953 | Lawson | 210/43 |
| 2,858,026 | 10/1958 | Lorimer | 210/444 |
| 3,105,042 | 9/1963 | Roosa | 210/94 |
| 3,122,501 | 2/1964 | Hultgren | 210/94 |

(List continued on next page.)

FOREIGN PATENT DOCUMENTS

| 708287 | 7/1931 | France . |
| 532784 | 9/1931 | Germany . |
| 57-7204 | 1/1983 | Japan . |
| 2078536 | 6/1981 | United Kingdom . |
| 2115305 | 1/1983 | United Kingdom . |

OTHER PUBLICATIONS

Purolater GP18–02 Brochure.

Primary Examiner—Ivars Cintins
Attorney, Agent, or Firm—Christopher H. Hunter

[57] ABSTRACT

A fuel filter assembly (10) for filtering diesel fuel includes a filter head (12), a spin-on replaceable element (13) and a collection bowl (15) removable from the element. The element includes a casing (52) with a turned-in edge portion at a lower end. An adaptor ring (69) is supported on said edge portion inside the element and includes an annular threaded portion (71). The collection bowl has an outer peripheral wall (74) with an annular threaded portion engaging the threaded portion of the adaptor ring. The outer peripheral wall of the bowl has an annular shoulder abutting the turned-in edge portion of said casing to clamp said casing between the adaptor ring and the bowl, when the bowl is attached to the element. The adaptor ring has a plurality of spaced ribs (70) with projections that extend upward and radially outward to maintain the filter medium (55) spaced from an inner wall surface of the casing. A resilient member (68) holds the filter medium between a top plate (62) and the adaptor ring.

14 Claims, 3 Drawing Sheets

U.S. PATENT DOCUMENTS

| | | | |
|---|---|---|---|
| 3,154,487 | 10/1964 | Thornton et al. | 210/323 |
| 3,199,676 | 8/1965 | May | 210/114 |
| 3,225,929 | 12/1965 | Sicard | 210/232 |
| 3,228,527 | 1/1966 | McPherson | 210/307 |
| 3,280,981 | 10/1966 | Renfrew | 210/197 |
| 3,312,351 | 4/1967 | Kasten | 210/307 |
| 3,333,703 | 8/1967 | Scavuzzo et al. | 210/232 |
| 3,502,218 | 3/1970 | Tuffnell et al. | 210/305 |
| 3,508,658 | 4/1970 | McVay | 210/14 |
| 3,674,043 | 7/1972 | Norton | 137/12 |
| 3,710,942 | 1/1973 | Rosenberg | 210/136 |
| 3,931,011 | 1/1976 | Richards et al. | 210/136 |
| 4,083,780 | 4/1978 | Call | 210/23 H |
| 4,091,265 | 5/1978 | Richards et al. | 219/501 |
| 4,231,768 | 11/1980 | Seibert et al. | 55/179 |
| 4,241,787 | 12/1980 | Price | 166/105 |
| 4,253,954 | 3/1981 | Midkiff et al. | 210/168 |
| 4,257,890 | 3/1981 | Hurner | 210/112 |
| 4,292,179 | 9/1981 | Stone et al. | 210/443 |
| 4,296,810 | 10/1981 | Price | 166/265 |
| 4,298,465 | 11/1981 | Druffel | 210/304 |
| 4,372,847 | 2/1983 | Lewis | 210/86 |
| 4,387,691 | 6/1983 | Marcoux et al. | 123/557 |
| 4,406,785 | 9/1983 | Siefer | 210/186 |
| 4,425,239 | 1/1984 | Jacocks et al. | 210/787 |
| 4,437,986 | 3/1984 | Hutchins et al. | 210/130 |
| 4,500,425 | 2/1985 | Thornton et al. | 210/136 |
| 4,501,255 | 2/1985 | Vanderploeg et al. | 123/557 |
| 4,502,955 | 3/1985 | Schaupp | 210/149 |
| 4,502,956 | 3/1985 | Wilson et al. | 210/248 |
| 4,619,764 | 10/1986 | Church et al. | 210/248 |
| 5,244,571 | 9/1993 | Church et al. | 210/232 |
| 5,622,623 | 4/1997 | Stone | 210/232 |

FUEL FILTER ELEMENT

CROSS REFERENCE TO RELATED APPLICATIONS

This is a continuation of U.S. patent application No. 08/441,583, filed May 15, 1995, now U.S. Pat. No. 5,622,623; which is a continuation of U.S. patent application Ser. No. 08/131,824, filed Oct. 5, 1993, now abandoned; which is a division of U.S. Pat. application Ser. No. 08/097,787, filed Jul. 27, 1993, now abandoned; which is a division of U.S. patent application Ser. No. 07/683,096, filed Apr. 10, 1991, now U.S. Pat. No. 5,244,571; which is a continuation of U.S. patent application Ser. No. 07/586,827, filed Sep. 24, 1990, now abandoned; which is a division of U.S. patent application Ser. No. 07/370,097, filed Jun. 20, 1989, now U.S. Pat. No. 4,997,555; which is a continuation of U.S. patent application Ser. No. 07/242,791, filed Sep. 8, 1988, now abandoned; which is a continuation of U.S. patent application Ser. No. 07/032,834, filed Mar. 30, 1987, now abandoned; which is a continuation-in-part of U.S. patent application Ser. No. 06/784,292, filed Oct. 7, 1985, now U.S. Pat. No. 4,692,245; which is a continuation-in-part of U.S. patent application Ser. No. 06/733,808, filed May 14, 1985, now U.S. Pat. No. 4,668,393.

BACKGROUND OF THE INVENTION

This invention relates to diesel fuel filters and more particularly to a fuel filter which includes heater means therein for elevating the temperature of the fuel to prevent buildup of residues and subsequent clogging of the fuel system.

The application of heater devices to diesel fuel filters has become accepted in the field because of the successful results obtained and the fact that much wider temperature ranges can be accommodated, which had previously introduced problems of clogging and plugging of the filters. While initially heaters were adapted to pre-existing filter devices, it has now become commonplace to incorporate the heater as an integral part of the filter assembly and to achieve an efficient heat transfer with the fuel being passed to the filter element.

In particular, heater elements have been applied to the spin-on type of fuel filter wherein it is desired not only to obtain an efficient heat transfer relationship, but also to provide an efficient housing structure which can be incorporated safely into an engine compartment and still provide relatively free access for filter changes, maintenance and the like. Particular attention has been paid in such devices to the retention of a quantity of fuel in the filter head and/or the heater element so that when the filter element is exchanged there is not an excessive spillage of fuel. An alternate scheme is to provide means for efficiently draining the filter casing or cartridge prior to removal of the spin-on element so as to avoid or minimize the fuel spillage problem.

One device of this type is shown in U.S. Pat. No. 4,387,691 wherein a particular form of heater structure is employed in the filter head of a filter assembly which includes a spin-on type of filter element. Particular attention is paid in this disclosure to the routing of fluids through the heater structure and the filter medium so as to achieve an efficient and advantageous heat transfer relationship.

A similar arrangement of diesel fuel heater is shown in U.S. Pat. No. 4,406,785 wherein a plurality of PTC fuel heater elements are disposed on a conducive plate and located within the filter head of a fuel filter assembly to achieve the heat transfer relationship. In this form of apparatus, a circuitous path of travel for fluid flow through the heater element is provided which is on the order of 360° in angular length and the heater is directly operative in the fuel path.

Still another form of prior art device is shown in U.S. Pat. No. 4,596,224 wherein a separate insulative housing is provided for the fuel heater which housing is disposed between the filter head and the spin-on element and in which, again, a circuitous path of travel for the fluid flow is provided.

A more recent disclosure is made in U.S. Pat. No. 4,608,161 wherein a fuel heater structure is disposed in the filter head of the filter assembly. In this disclosure special structure is provided between the filter head and the spin-on filter element to displace fuel which might have been trapped in this location and which avoids significant fuel spillage upon element replacement.

SUMMARY OF THE INVENTION

The apparatus of the instant invention is an improvement over these types of devices in providing a heater structure which is located in the filter head of a filter assembly, which filter assembly includes a compound spin-on element comprising a casing for a filter element subassembly together with a removable threaded collection bowl. This form of structure is particularly suited for the spin-on type of filter element in providing a convenient and safe mechanism for accommodating the element exchange and also providing an efficient heat transfer relationship between the fuel heater and the diesel fuel passing through the filter apparatus.

The apparatus of the instant invention is particularly concerned with a spin-on diesel fuel filter structure which incorporates a number of features in the die cast head structure for the assembly. These include, among others, the heater element and a particular form of return check valve in fluid communication with an inlet chamber in the filter head for releasing trapped air and for returning fuel to the fuel system of the engine. The die cast head assembly includes not only inlet and outlet ports for interconnection with the fuel system of the vehicle, but also additional ports for the provision of a vent/calibration valve and a vacuum switch, both of which are In fluid communication with an outlet chamber in the filter head.

The entire filter assembly is supported by the filter head which may be attached at any convenient location in the engine compartment. Interconnection with the replacement spin-on element is made by means of a threaded tube In the filter head which provides not only the mounting device but also a means for securing the fuel heater in the filter head and making electrical connection therewith. The fuel heater is an annular can structure having a central mounting aperture adapted to receive the threaded tube and consisting of an upper insulating housing and a lower conductive plate which is in electrical connection with the threaded tube. A feed-through electrical contact and thermostat assembly provides electrical power to a pair of PTC-type heater elements disposed on the conductive plate. A circuitous fuel path is established so that a suitable heat transfer relationship is achieved with the heater elements.

The spin-on element comprises a removable collection bowl which is threadedly attached to an adaptor member secured in the spin-on element casing. The casing in turn is supported by a rigid top plate from the threaded tube and contains therewithin the filter element subassembly comprising an annular filter medium contained within upper and lower end caps and surrounding a central perforated supported tube. A filter drain assembly and water sensor probe are included in the collection bowl for removal of water and other contaminants or for removal of fluid preparatory to exchange of the spin-on element.

BRIEF DESCRIPTION OF THE DRAWINGS

FIG. 1 is a schematic drawing of the fuel filter assembly of the invention in a typical fuel supply and return system for a diesel engine and the like;

DETAILED DESCRIPTION OF THE INVENTION

Figure 1:
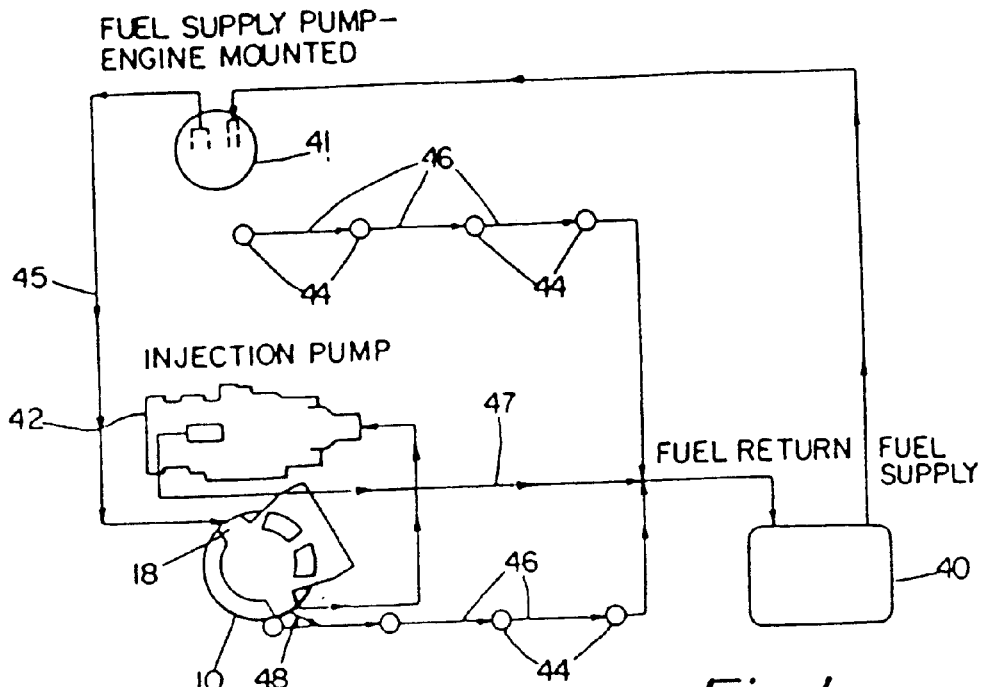
Figure 2:
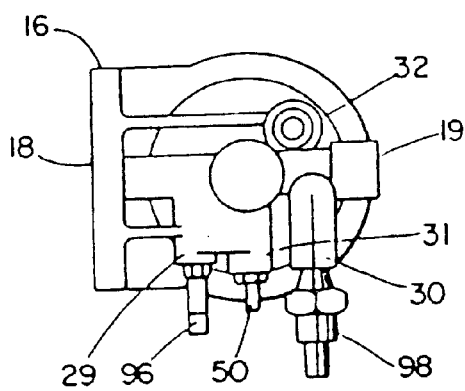
FIG. 2 is a plan view of the fuel filter assembly of the invention.

A fuel filter assembly 10 for filtering and heating fuel for diesel engines and the like comprises a filter head 12, a spin-on element 13 and collection bowl 15. The filter head is fastened to an engine or other suitable structure by flange 16 and supports the entire fuel filter assembly 10. Preferably, filter head 12 is a die cast head and includes therein typical inlet port 18, outlet port 19, and connected respectively thereto, inlet chamber 21 and outlet chamber 22. Filter head 12 is a generally circular structure having a flat annular mounting surface 24 at the lower portion thereof for sealing engagement by the spin-on element 13 and further includes annular cavity 25 forming a part of inlet chamber 21 and surrounding a circular portion of outlet chamber 22. Heater assembly 26 is received in cavity 25 of inlet chamber 21 and is secured in place by threaded tube 28, the central portion of which communicates with outlet chamber 22. Filter head 12 further comprises vent port 29 and vacuum switch port 30, both of which are in fluid communication with outlet chamber 22 and return check valve port 31 which is in fluid communication with inlet chamber 21. Still further, filter head 12 includes the heater port 32 which houses a feed through connector 34 and thermostat 35 for supplying electrical power to heater assembly 26.

Referring to FIG. 1, the fuel supply system for a typical diesel engine is depicted in schematic form as comprising fuel tank 40, fuel pump 41, the fuel filter assembly 10 of the instant invention, injection pump 42 and a plurality of injectors 44. Typical fuel lines are interconnected among the various components of the system with, for example, fuel line 45 connected to the inlet port 18 of filter assembly 10 and with various bleed lines 46 providing a fuel return path from each of the injectors 44 to the fuel tank 40. Bleed line 47 is also depicted as returning fuel from injection pump 42 to fuel tank 40 as a part of the fuel system. Not depicted in FIG. 1 but understood as comprising a part of the fuel system, are pressure lines between the injection pump 42 and each of the injectors 44 which supply fuel to the diesel engine. A further bleed line 48 is shown as connected between fuel filter assembly 10 and fuel tank 40 by way of bleed lines such as 46, this being the line which is connected from a return check valve 50 connected at the return check valve port 31. In turn, port 31 is connected to inlet chamber 21 of filter head 12 for venting air and fuel from fuel filter assembly 10 which air is entrained in the diesel fuel or which is trapped therein upon change of the spin-on element 13.

Figure 4:
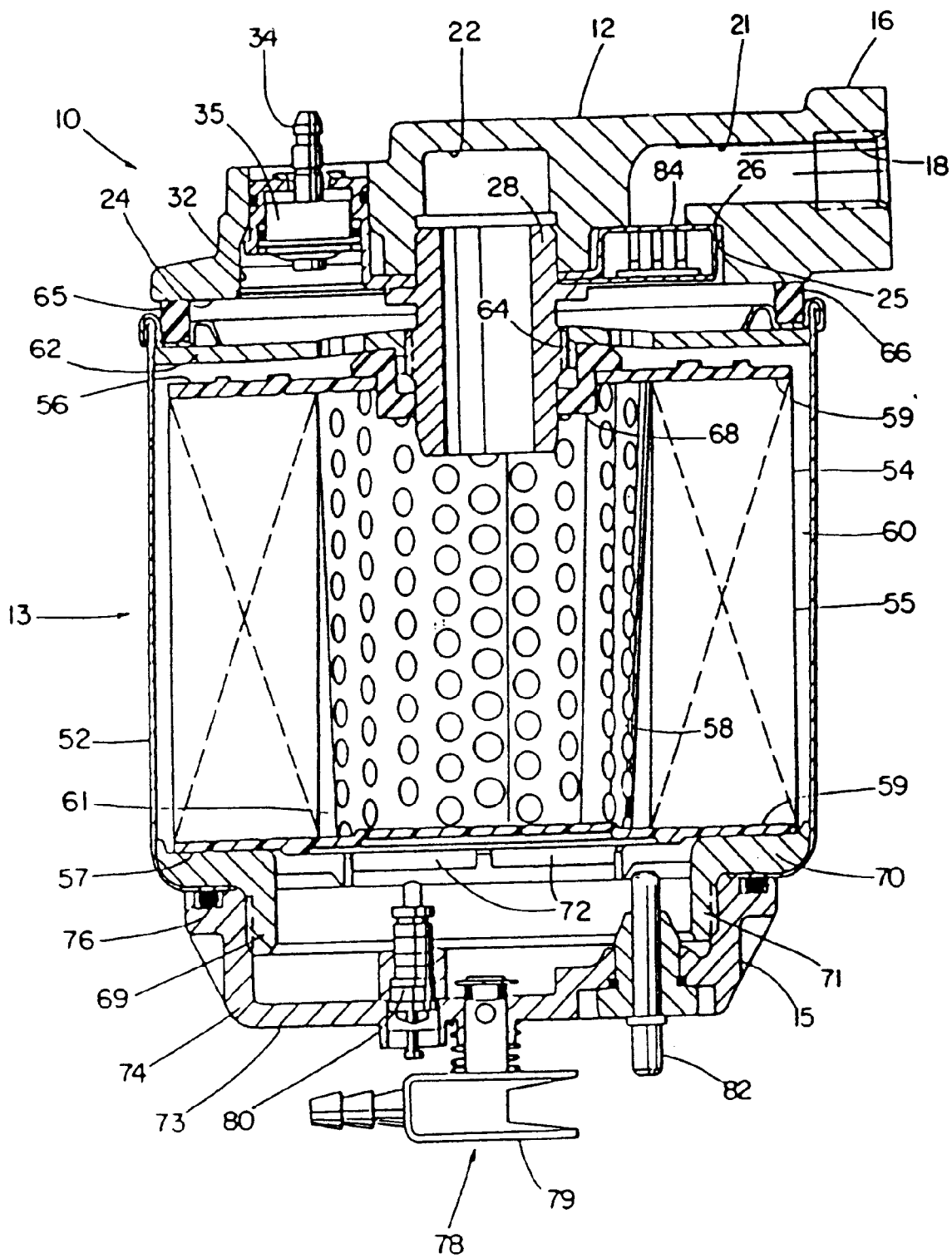
FIG. 4 is a sectional view of the fuel filter assembly of the invention.

Referring now more particularly to the cross sectional view of FIG. 4, spin-on element 13 is seen to comprise a cylindrical housing or casing 52 which houses filter element 54 for separating out contaminants and particulate matter in the fuel passing through the filter assembly. Filter element 54 comprises filter medium 55 which is an annulus or loop of pleated paper element well know in the art or any other form of filter medium which would be suitable for separating out contaminants. Filter medium 55 is housed between upper end cap 56 and lower end cap 57 each of which comprise generally circular sheet metal plates for supporting the filter structure. Both of the end caps 56, 57 include circular ridges at the outer periphery thereof which extend inwardly of the filter medium 55 to further contain the structure. A perforated central support tube 58 is housed in the center of the structure centrally of the filter medium 55 and all of the elements are secured together by means of potting compound closely adjacent the inner surfaces of the upper and bottom end caps 56, 57 respectively. Therefore it is apparent that filter medium 55 divides the spin-on element casing 52 into an outer peripheral fuel chamber 60 and a central fuel chamber 61.

Filter element 54 further includes rigid top piece or top plate 62 which is a disc shaped member generally of circular configuration having a central threaded opening or aperture 64 and a plurality of further openings 65 which surround the central aperture and provide a path for fuel flow through the top plate 62. An annular gasket 66 is provided above top plate 62 and which is a resilient member retained in place on the spin-on element 13 to provide sealed engagement with mounting surface 24 of filter head 12. Spin-on element 13 further comprises an inner annular gasket 68 which is a resilient member pressed in place in a central opening in upper end cap 56 and retained in position by being trapped between end cap 56 and top plate 62. Gasket 68 provides a seal for spin-on element 13 when in engagement with a smooth portion of the outer periphery of threaded tube 28 as depicted in FIG. 4. At the lower portion thereof, spin-on element 13 further comprises adaptor ring 69 which is a continuous ring shaped member adapted to lie flat and be sealed against a lower turned-in edge of casing 52 by means of a polyester adhesive material. Adaptor ring 69 includes a plurality of radially oriented and circumferentially distributed upstanding ribs 70 and a depending annular threaded portion 71 for securement of collection bowl 15. Upstanding ribs 70 include upstanding, radially extending projections or ridges thereon that extend in the peripheral fuel chamber between the bottom of filter medium 55 and an inner wall surface of casing 52 that serve to maintain the filter medium in spaced relation therefrom. Upstanding ribs 70 provide fluid paths 72 therebetween for flow of contaminants and the like to the interior of collection bowl 15.

Spin-on element 13 is fabricated by placement and adhesion of adaptor ring 69 against the lower turned-in end of casing 52. Thereafter, filter element 54, as a subassembly, is positioned on the ribs 70 of adaptor ring 69 thereby forming the fluid paths 72. Inner annular gasket 68 is placed in position in the central opening of upper end cap 56 and top plate 62 placed thereover with the material forming the central threaded aperture 64 pressed into an inner peripheral opening of gasket 68. A thin metal plate covering top plate 62 and welded in place thereto is then secured to casing 52 by means of a rolled edge to secure the entire spin-on element assembly 13. Annular gasket 66 is positioned in an annular groove above top plate 62 and is retained in place therein by several indented portions. A more detailed description of spin-on element 13 may be obtained in co-pending application Ser. No. 784,292, now U.S. Pat. No. 4,692,245 assigned to the assignee of the instant invention, which is incorporated herein by reference.

Referring now to the collection bowl 15 shown at the lower portion of spin-on element 13 in FIG. 4, this device comprises a cup-like member having bottom wall 73 and peripheral side wall 74. The latter has an internally threaded portion thereon and culminates at the upper edge in an annular groove in which o-ring seal 76 is disposed for sealing engagement with the lower surface of the turned-in edge of casing 52. Collection bowl 15 has a filter drain assembly 78 mounted in the lower portion thereof for disposing of water accumulated in the collection bowl and for draining of the entire spin-on element 13 upon replacement of the latter. Filter drain 78 comprises pop-up valve 79 mounted in an opening in bottom wall 73 of collection bowl 15 as well as vent valve 80 which is adapted to allow air to be drawn into the collection bowl 15 to relieve the partial vacuum created therein on opening of pop-up valve 79. Further mounted in lower wall 73 of collection bowl 15 is a water sensor probe 82 which is an insulated electrical conductor adapted to achieve electrical continuity with fluid in the collection bowl when the fluid rises to a level to contact its exposed inner end.

Figure 5:
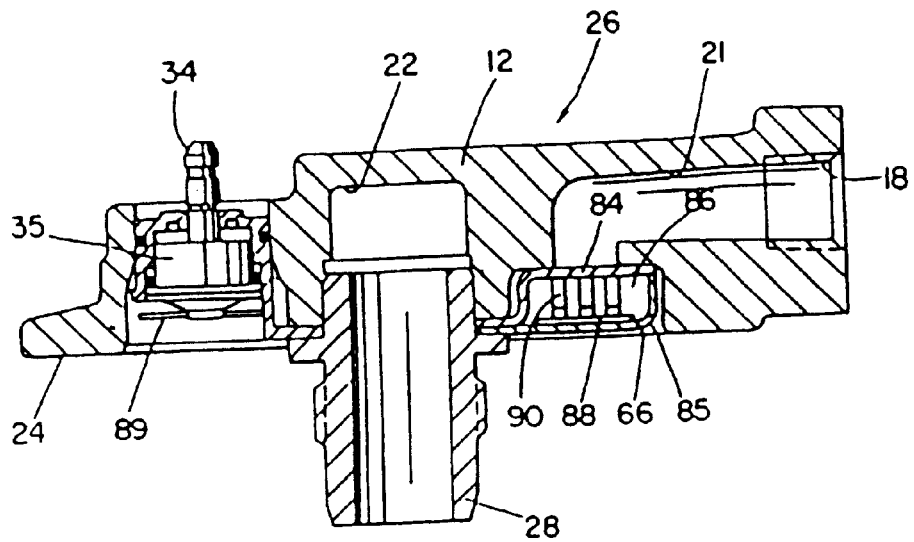
FIG. 5 is a sectional view of the filter head portion of the fuel filter assembly.
Figure 6:
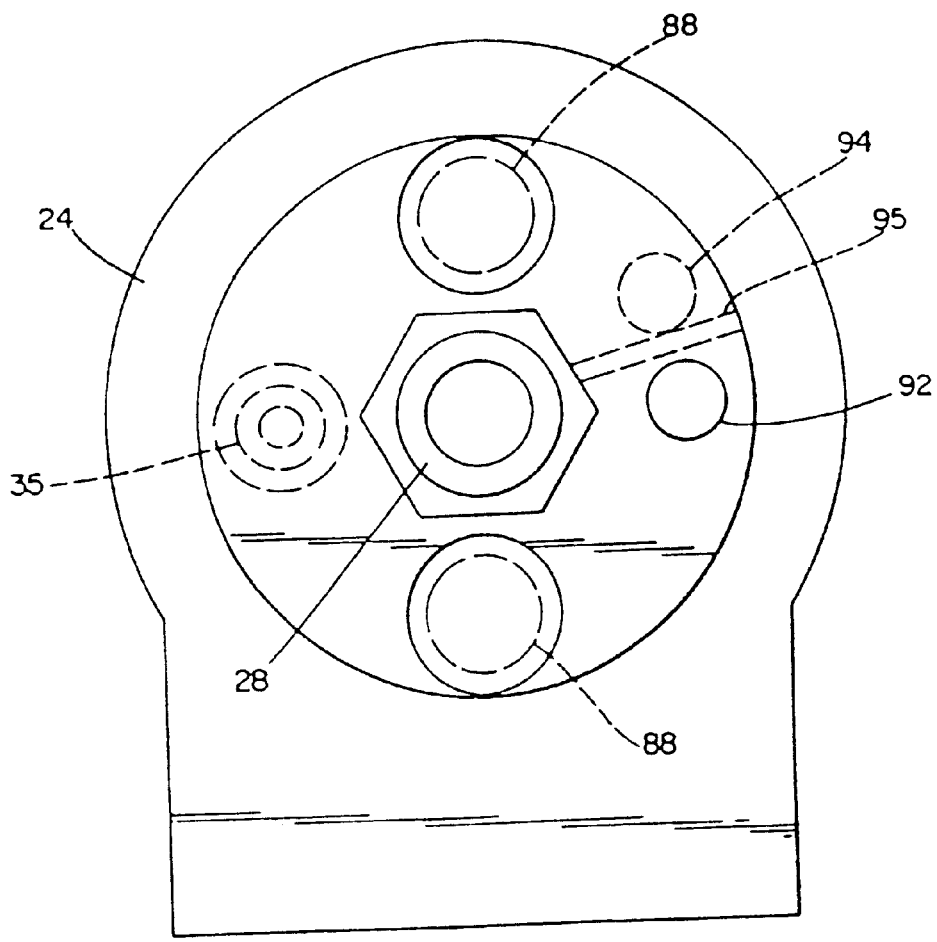
FIG. 6 is a bottom view of the filter head assembly of FIG. 5.

Heater assembly 26 is shown in more detail in the views of FIGS. 5 and 6 as comprising an annular container formed essentially of an upper insulating cover 84 and a lower conductive cup 85 which are joined at their margins and staked in place to provide a fuel heater enclosure 86 of generally annular configuration. Upper insulated cover 84 is depressed at the central portion thereof to form the inner margin of annular enclosure 86 and is received on a central stud in filter head 12 for securement in inlet chamber 21. Lower conductive cup 85 is depressed at two locations about its lower wall, spaced 180° apart for receipt of a pair of heater element discs 88 which are the devices which supply the thermal energy for warming of the diesel fuel passing through heater assembly 26. Heater discs 88 are positive temperature coefficient (PTC) semiconductor elements which are commonly employed for similar purposes and which have a self-regulating thermal capability due to their relatively high positive temperature coefficient. This provides regulation of the electrical input and thus, the power output of the heater discs. A conductive plate of generally half-ring configuration is joined to the inner end of feed through connector 34 and thermostat 35 to supply electrical power to one side of heater discs 88 by means of a plurality of spring fingers 90 depending from conductive plate 89 at the location of each of discs 88. As noted, lower conductive cup 85 is in contact with threaded tube 28 which in turn is threaded into filter head 12, and with all of these devices made of highly conductive metal, this arrangement provides an efficient ground connection for the heater assembly 26.

Feed through connector 44 and thermostat 35 are combined as a subassembly for insertion in an opening in upper insulated cover 84, the latter being sealed by means of an o-ring engagement with filter head 12 while the thermostat 35 itself is sealed on the interior with a further o-ring. As noted more clearly in the view of FIG. 6, heater assembly 26 includes an outlet aperture 92 in the lower conductive cup 85, an inlet aperture 94 in the upper insulated cover 84 and a barrier consisting of radially positioned wall 95 extending downwardly from upper cover 84 to the lower conductive cup 85 to provide a blockage in the annular fuel enclosure 86 in heater assembly 26. Thus, fuel entering inlet port 18 and inlet chamber 21 of filter head 12 is directed to the upper cover 84 of heater assembly 26 and into inlet opening 94, to be passed in a circuitous path of approximately 360° over and around the heater elements discs 88 to outlet opening 92 in lower conductive cup 85. Fuel then flows to the space between filter head 12 and top plate 62 of spin-on element 13 to pass through the openings 65 in the top plate and into outer peripheral fuel chamber 60. As fuel traverses filter medium 55 moisture and other contaminants are collected on the outer surface thereof and drop to the bottom of casing 52, thereafter to pass through the fluid paths 72 in adaptor ring 69 and to be collected in collection bowl 15. Fuel that traverses filter medium 55 enters perforated tube 58 and the central fuel chamber 61 and is delivered through threaded tube 28 to outlet chamber 22 and outlet port 19 for delivery to a further part of the fuel system of the vehicle.

In replacement of the spin-on element 13 it is only necessary to actuate the filter drain 79 and remove not only contaminants from collection bowl 15 but also fuel that may be entrained in filter medium 55, peripheral fuel chamber 60 and the cavities located above the spin-on element 13. Element 13 may then be unthreaded from filter head 12 and removed therefrom for replacement purposes. During this procedure, collection bowl 15 is unthreaded from spin-on element 13, a new spin-on element introduced to which the collection bowl 15 is threaded and secured in position and the entire new spin-on element 13 attached to threaded tube 28 to be secured to filter head 12. At this point a vacuum could be applied to vent valve 96 which is merely a check valve threaded into vent valve port 29 to draw fuel throughout the filter assembly until the outlet chamber 22 is filled or alternatively, a fuel supply pump as at 41 could be actuated to force fluid through the filter assembly until the apparatus is again filled. In this procedure air that has been introduced into the assembly during interchange of spin-on element 13 will tend to rise to the top of inlet chamber 21 and air that is entrained in the diesel fuel will similarly rise to the top of inlet chamber 21. At this location return check valve 50 will become operative to vent air from the chamber and fluid as well to the return line 48 to be returned eventually to the fuel tank 40. In this manner a considerable amount of air which had previously been trapped in the fuel filter assembly will be expunged therefrom to provide more reliable operating characteristics.

Figure 7:
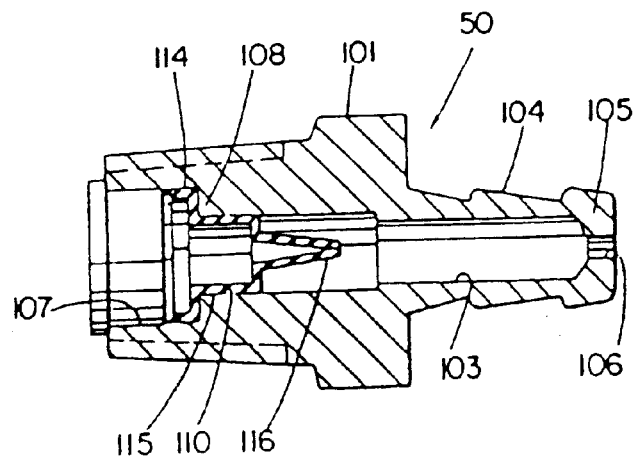
FIG. 7 is a sectional view of the return check valve used in the fuel filter assembly.
Figure 3:
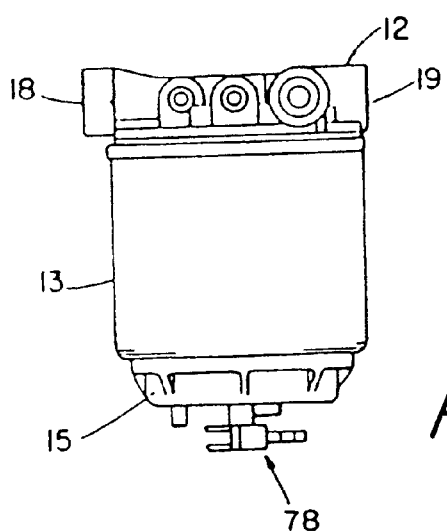
FIG. 3 is an elevational view of the fuel filter assembly of the invention.

Referring to the FIG. 7 cross sectional view, return check valve 50 comprises metal body member 101 having a hex portion thereon, an externally threaded inner end, and a central axial stepped bore 103 therein. The outer end portion of body 101 is a reduced tubular part having barbs 104 thereon and a closure member 105 at the outer end to provide a fitting for push on tubing or the like to serve as a drain line for return of fuel to a fuel tank 40. Closure member 105 includes a small central orifice 106 therein which is typically on the order of 0.040 inches in diameter and which serves as a device to restrict flow of fuel through the return check valve 50. Inner end 107 of bore 103 is enlarged and the bore 103 is stepped in several locations toward the outlet end at orifice 106. Seated in bore 103, against shoulder 108 is check valve 110 which is a single piece elastomeric part in the form of a duck-bill valve. Check valve 110 comprises a circular entrance ring 114 of relatively thick proportions, a tubular portion 115 and a pair of lips 116 in the shape of a duck's bill which provides a check valve function for the valve 110. The lips 116 taper inwardly from tubular portion 115 and are closely adjacent one another at their downstream end to provide a seal against fluid flow in the reverse direction, but are sufficiently flexible to be distended slightly upon fluid flow from the inlet of check valve 50 toward the orifice 106 to provide very little resistance to such fluid flow. Similarly, air that is trapped within inlet chamber 21 of filter head 12, passes with the fluid through check valve 50 to fuel tank 40. The relatively small size of outlet orifice 106 in return check valve 50 assures that while a substantially continuous flow of fluid is provided such flow will be restricted to a relatively minimal amount sufficient to assure clearance of entrapped air in filter head 12. Since return check valve 50 is connected from inlet chamber 21 to the fuel tank 40 it will be noted that it is in bypass connection of filter medium 55 and does provide some relief for excessive pressure differentials exhibited at the filter medium 55. It will be noted that the vacuum switch 98 of conventional variety is threaded in vacuum switch port 30 of filter head 12 in fluid communication with outlet port 19 so as to provide an indication of the pressure level in this chamber and a signal of the clogging or contamination of filter medium 55 so that replacement can be performed as necessary.

I claim:

1. A fuel filter element comprising:

a housing means;

an annular filter medium separating a central fuel chamber from a peripheral fuel chamber within said housing means; and a ring shaped member;

said housing means having a turned-in lower edge portion supporting said ring shaped member, said ring shaped member having an annular threaded portion whereby a collection bowl can be removably attached to said filter element, said filter element further including flow passage means externally of said medium for enabling contaminants to pass from said peripheral fuel chamber downwardly and interiorly of said annular threaded portion of said ring shaped member, whereby contaminants may be collected within said collection bowl attached to said filter element.

2. The filter element according to claim 1 wherein said element includes coupling means for spin-on attachment of the element to a filter head.

3. The filter element according to claim 2, further including seal means disposed between said coupling means and said filter medium.

4. The filter element according to claim 1 wherein said element includes a threaded opening for spin-on attachment of the element to a filter head.

5. The filter element according to claim 1, wherein said filter element includes upper and lower end caps bonded to upper and lower ends of said filter medium, said flow passage means located between said lower end cap and said turned-in lower edge portion.

6. A fuel filter element comprising:

a housing means;

an annular filter medium separating a central fuel chamber from a peripheral fuel chamber within said housing means;

a ring shaped member;

said housing means including an annular turned-in edge portion at a first end, said edge portion in supporting relation of said ring-shaped member; said ring-shaped member including an annular threaded portion whereby a collection bowl may be removably attached to said filter element; said filter element further including at least one flow passage extending from said peripheral chamber and interiorly of said annular threaded portion of said ring-shaped member and exteriorly of said filter medium, whereby contaminants may be collected within said attached collection bowl.

7. The filter element according to claim 6, wherein said filter element includes first and second end caps bonded to first and second ends of said filter medium, the flow passage defined between one of said end caps and said ring-shaped member.

8. The filter element according to claim 6, further including a top plate at a second end of said housing means, said top plate having a threaded opening for spin-on attachment of the element to a filter head, and an annular seal disposed between and in sealing relationship with said top plate and said filter medium.

9. A fuel filter element comprising:

a generally cylindrical housing;

an annular filter medium separating a central fuel chamber from a peripheral fuel chamber within said housing; and a ring shaped member;

said housing having an annular turned-in lower edge portion supporting said ring shaped member, said ring shaped member having an annular threaded portion whereby a collection bowl can be removably attached to said filter element, said filter element further including a flow passage extending from said peripheral fuel chamber downwardly and interiorly of said annular threaded portion of said ring shaped member and exteriorly of said filter medium, whereby contaminants may pass to the collection bowl when attached to said filter element.

10. The filter element according to claim 9, further including upper and lower end caps bonded to upper and lower ends of said filter medium, the flow passage defined between said lower end cap and said ring-shaped member.

11. The filter element according to claim 9, further including a top plate on said housing, said top plate having a threaded opening for spin-on attachment of the element to a filter head, and an annular seal disposed between and in sealing relationship with said top plate and said filter medium.

12. A filter element comprising:

a generally cylindrical housing;

an annular filter medium separating a central chamber from a peripheral chamber within said housing;

a ring shaped member;

said housing including an annular turned-in edge portion at a first axial end, said edge portion in supporting relation of said ring shaped member; said ring shaped member including an annular threaded portion whereby a collection bowl may be removably attached to said filter element; said filter element further including at least one flow passage extending from said peripheral chamber radially interiorly of said annular threaded portion of said ring shaped member and externally of said filter medium, whereby contaminants may be collected within the collection bowl when attached to the filter element.

13. The filter element according to claim 12, wherein said filter element includes first and second end caps bonded to first and second ends of said filter medium, the flow passage defined between one of said end caps and the ring-shaped member.

14. The filter element according to claim 12, further including a top plate at a second end of said housing, said top plate having a threaded opening for spin-on attachment of the element to a filter head, and an annular seal disposed between and in sealing relationship with said top plate and said filter medium.

* * * * *